(12) United States Patent  
Hong

(10) Patent No.: US 8,068,688 B2
(45) Date of Patent: Nov. 29, 2011

(54) DEVICE AND METHOD FOR ESTIMATING DEFOCUS BLUR SIZE IN AN IMAGE

(75) Inventor: Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/933,850

(22) PCT Filed: Feb. 2, 2009

(86) PCT No.: PCT/US2009/032825
§ 371 (c)(1),
(2), (4) Date: Sep. 21, 2010

(87) PCT Pub. No.: WO2009/145931
PCT Pub. Date: Dec. 3, 2009

(65) Prior Publication Data
US 2011/0019932 A1 Jan. 27, 2011

(51) Int. Cl.
G06K 9/40 (2006.01)
(52) U.S. Cl. ...................................................... 382/255
(58) Field of Classification Search .................. 382/255, 382/276, 278, 275; 708/422
See application file for complete search history.

(56) References Cited

U.S. PATENT DOCUMENTS

| 5,132,842 A | 7/1992 | Yeh |
| 5,550,935 A | 8/1996 | Erdem et al. |
| 5,729,631 A | 3/1998 | Wober et al. |
| 6,124,890 A * | 9/2000 | Muramoto ..................... 348/345 |
| 6,671,404 B1 | 12/2003 | Kawatani et al. |
| 2005/0249929 A1 | 11/2005 | Keichwein et al. |
| 2007/0047788 A1 | 3/2007 | Slablaugh et al. |

FOREIGN PATENT DOCUMENTS

| GB | 2213017 A | 8/1989 |
| WO | WO2009145931 A1 | 12/2009 |

OTHER PUBLICATIONS

Notification of Transmittal of International Preliminary Report on Patentability for PCT/US2009/032825, date of mailing Sep. 29, 2010, Nikon Corporation.
International Search Report and Written Opinion for PCT/US2009/032825, publication date Mar. 16, 2009, Nikon Corporation.

* cited by examiner

Primary Examiner — Daniel Mariam
(74) Attorney, Agent, or Firm — Roeder & Broder LLP

(57) ABSTRACT

A method for estimating a defocus blur size (520) in a defocused blurred input image (14) includes the steps of removing at least a portion of any content correlation (464) from the input image (14) to generate a decorrelated image, and computing an autocorrelation matrix (570) from the decorrelated image. Subsequently, the method can include the steps of rotating the autocorrelation matrix (468) to a plurality of alternative angles to generate a plurality of rotated matrixes, and averaging the plurality of rotated matrixes (470) to calculate an averaged autocorrelation matrix (572). Next, the defocus blur kernel size (520) can be estimated from the averaged autocorrelation matrix (572). Additionally, the method can include the step of deblurring the input image (14) using the defocus blur size (520) to provide an adjusted image (22).

19 Claims, 6 Drawing Sheets

DEVICE AND METHOD FOR ESTIMATING DEFOCUS BLUR SIZE IN AN IMAGE

BACKGROUND

Cameras are commonly used to capture an image of a scene that includes one or more objects. Unfortunately, some of the images are blurred. For example, when the camera is not properly focused, one or more of the objects captured in the image will be blurred. Depending upon the degree of the improper focus, the resulting image may not be satisfactory.

There exists a number of deconvolution methods for reducing defocus blur in a blurry image. Typically, these methods require that a blur kernel size be estimated. Unfortunately, it can be very difficult to accurately automatically estimate the size of the blur kernel.

SUMMARY

The present invention is directed to a method for estimating a defocus blur size in a blurred input image. In one embodiment, the method includes the steps of removing at least a portion of any content correlation from the input image to generate a decorrelated image, and computing an autocorrelation matrix from the decorrelated image. Subsequently, the method can include the steps of rotating the autocorrelation matrix to a plurality of alternative angles to generate a plurality of rotated matrixes, and averaging the plurality of rotated matrixes to calculate an averaged autocorrelation matrix. Next, the defocus blur kernel size can be accurately estimated from the averaged autocorrelation matrix.

As used herein, the term "content correlation" shall mean correlation among pixels due to image scene structures, e.g., pixels belong to the same object tend to have stronger correlation than pixels from different object.

In one embodiment, the step of removing the content correlation includes the step of applying a decorrelation filter to the input image. More specifically, this step can include applying a Laplace type filter to the input image.

Additionally, the input image can be deblurred or deconvolved using the defocus blur size to provide an adjusted image.

Moreover, in certain embodiments, the present method can include the step of removing noise from the input image prior to the step of removing any content correlation and/or computing an autocorrelation matrix.

The present invention is also directed to device for estimating a defocus blur size in a blurred image. In this embodiment, a control system can perform some or all of the steps described herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
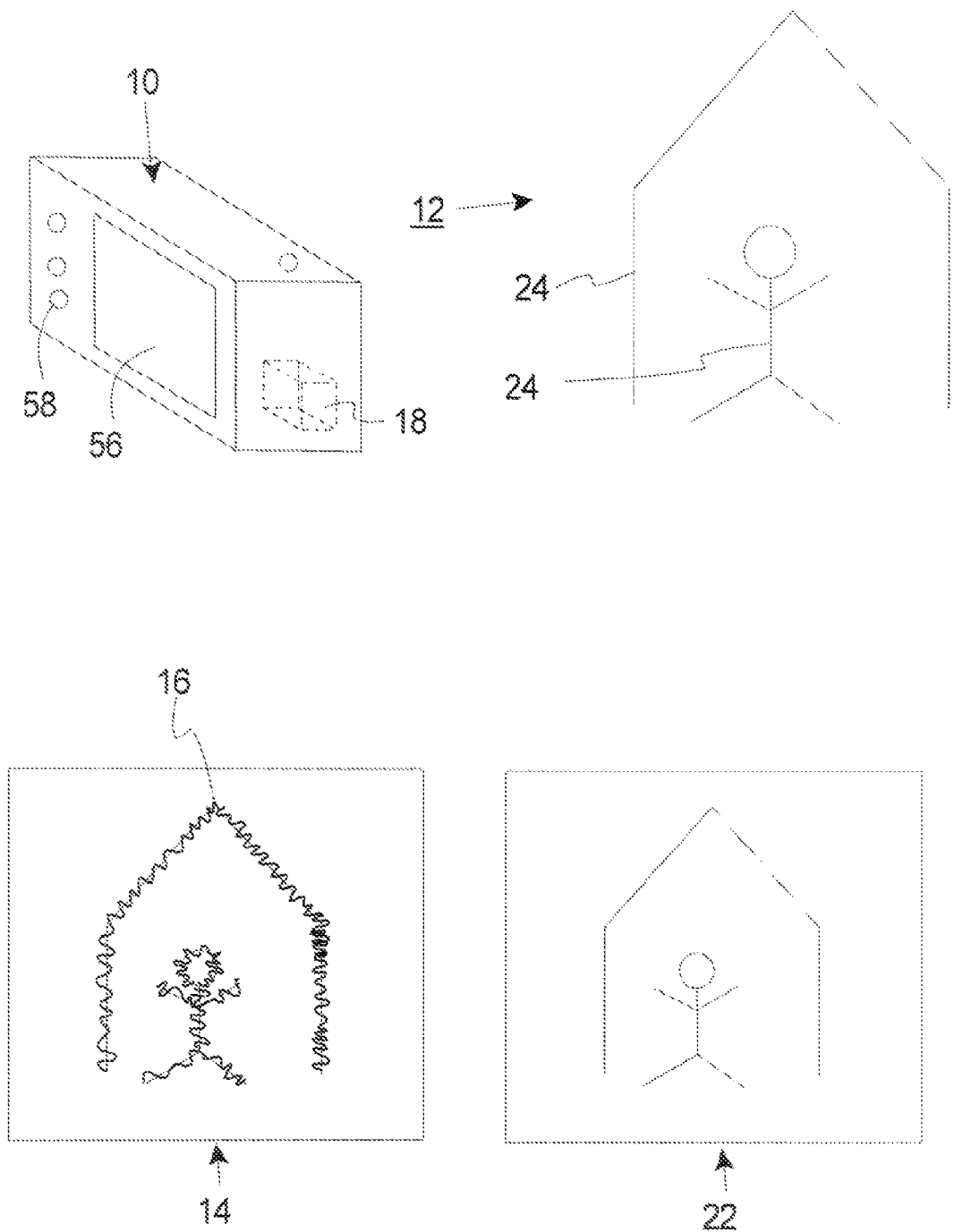
FIG. 1 is a simplified view of a scene, an image apparatus having features of the present invention, a blurred image, and an adjusted image.

FIG. 1 is a simplified perspective illustration of an image apparatus 10 having features of the present invention, and a scene 12. The image apparatus 10 captures a raw input image 14 (illustrated away from the image apparatus 10) that can include defocus blur 16 (illustrated as a thicker, wavy line). In one embodiment, the image apparatus 10 includes a control system 18 (illustrated in phantom) that uses a unique method for estimating a defocus blur size 320 (illustrated in FIG. 3) of the input image 14. In certain embodiments, with information regarding the blur size 320 in the input image 14, the amount of defocus blur 16 in the input image 14 can be accurately reduced.

As an overview, in one embodiment, the present method for estimating the defocus blur size 320 includes one or more of the steps of (i) denoising the input image 14, (ii) filtering the input image 14 to reduce content correlation from the input image 14, (iii) computing an autocorrelation matrix ("ACM") for input image 14, (iv) rotating the ACM to a plurality of different angles to get a plurality of rotated matrixes, (v) averaging the plurality of matrixes, and (vi) estimating the defocus blur kernel size based on the averaged matrix. Subsequently, the input image 14 can be deblurred utilizing the estimated blur kernel size to provide a deblurred adjusted image 22. Comparing the input image 14 to the adjusted image 22, the adjusted image 22 has significantly less blurring than the input image 14.

The type of scene 12 captured by the image apparatus 10 can vary. For example, the scene 12 can include one or more objects 24, e.g. animals, plants, mammals, and/or environments. For simplicity, in FIG. 1, the scene 12 is illustrated as including two objects 24. Alternatively, the scene 12 can include more than two or fewer than two objects 24. In FIG. 1, one object 24 is a simplified stick figure of a person, and one object 24 is a simplified illustration of a house.

It should be noted that the image apparatus 10 was not properly focused on the objects 24 in the scene 12 during the capturing of the input image 14. As a result thereof, the input image 14 has defocus blur 16.

It should be noted that with defocus blur 16, a point of light will appear as a circle of light, with the diameter of the circle corresponding to the blur kernel size. Stated in another fashion, defocus blur is typically disk shaped, with a strong correlation between each pixel and its neighboring pixels.

Figure 2:
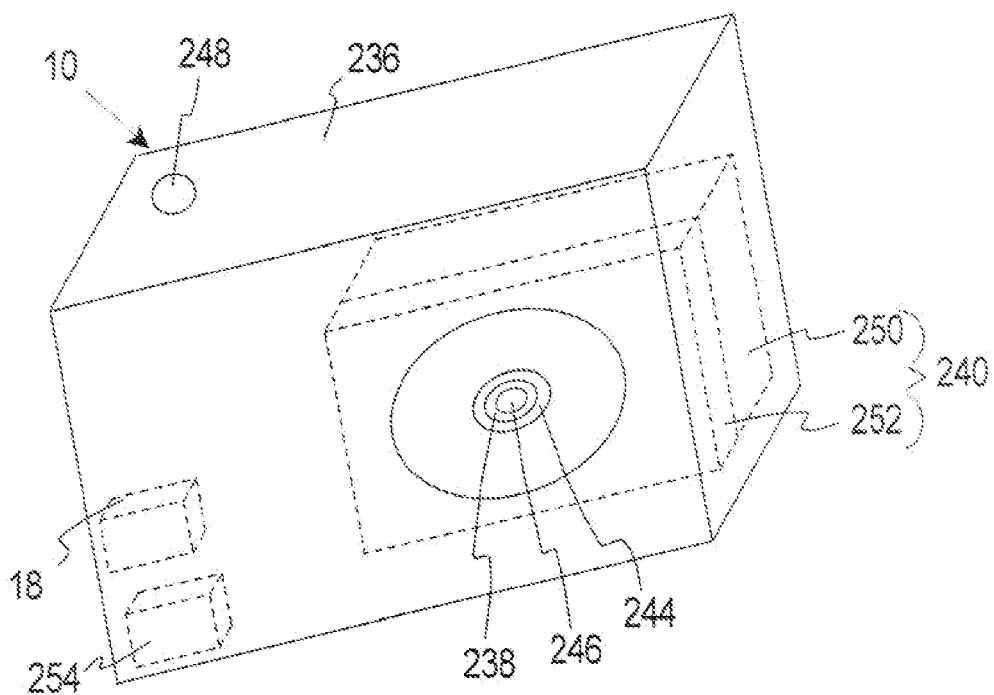
FIG. 2 is a simplified front perspective view of the image apparatus of FIG. 1.

FIG. 2 illustrates a simplified, front perspective view of one, non-exclusive embodiment of the image apparatus 10. In this embodiment, the image apparatus 10 is a digital camera, and includes an apparatus frame 236, an optical assembly 238, and a capturing system 240 (illustrated as a box in phantom), in addition to the control system 18 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 10 includes an autofocus assembly (not shown) including one or more lens movers that move one or more lenses of the optical assembly 238 in or out until the sharpest possible image of the subject is received by the capturing system 240.

The capturing system 240 captures information for the raw input image 14 (illustrated in FIG. 1). The design of the capturing system 240 can vary according to the type of image apparatus 10. For a digital type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various raw input images 14 (illustrated in FIG. 1) and/or one or more adjusted images 22 (illustrated in FIG. 1) before these images are ultimately printed out, deleted, transferred or downloaded to an auxiliary storage system or a printer. The storage system 254 can be fixedly or removable coupled to the apparatus frame 236. Non-exclusive examples of suitable storage systems 254 include flash memory, a floppy disk, a hard disk, or a writeable CD or DVD.

The control system 18 is electrically connected to and controls the operation of the electrical components of the image apparatus 10. The control system 18 can include one or more processors and circuits, and the control system 18 can be programmed to perform one or more of the functions described herein. In FIG. 2, the control system 18 is secured to the apparatus frame 236 and the rest of the components of the image apparatus 10. Further, the control system 18 is positioned within the apparatus frame 236.

In certain embodiments, the control system 18 includes software that estimates the blur kernel size 320 in the input image 14. Further, the control system 18 can include software that reduces the blur 16 in the input image 14 to provide the adjusted image 22.

Referring back to FIG. 1, the image apparatus 10 includes an image display 56 that displays the blurred image 14 and/or the adjusted images 22. With this design, the user can decide which images 14, 22 should be stored and which images 14, 22 should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen.

Further, the image display 56 can display other information that can be used to control the functions of the image apparatus 10.

Moreover, the image apparatus 10 can include one or more control switches 58 electrically connected to the control system 18 that allows the user to control the functions of the image apparatus 10. For example, one or more of the control switches 58 can be used to selectively switch the image apparatus 10 to the blur kernel size 20 estimation processes and/or deblurring processes disclosed herein.

Figure 3:
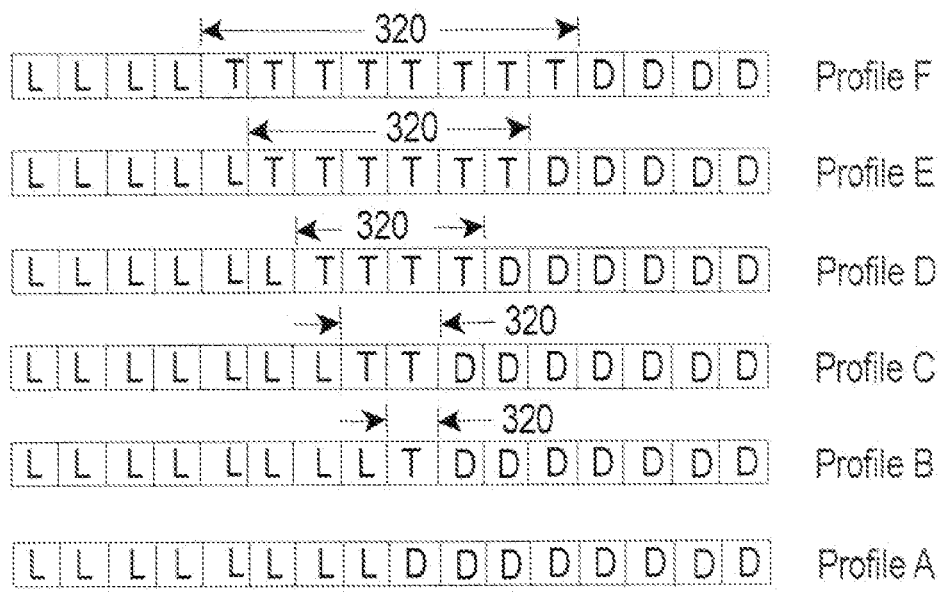
FIG. 3 is a simplified chart that illustrates alternative defocus blur kernel sizes of an edge.

FIG. 3 is a simplified chart that illustrates profiles of possible alternative blur kernel widths 320 of an edge in an image (not shown) along a single axis. In this chart, "L" represents light grey pixels, "D" represents dark grey pixels, and "T" represents the transition pixels between light grey pixels and dark grey pixels.

In the profile A (the bottom profile), the edge changes immediately from light grey pixels to dark grey pixels without any transition pixels. Thus, profile A has a blur kernel size 320 of zero. In contrast, profile B (the second from the bottom), the edge has a single transition pixels between the light grey pixels and the dark grey pixel. Thus profile B has a blur kernel size 320 of one. Further, (i) profile C (the third from the bottom) has two transition pixels and a blur kernel size 320 of two; (ii) profile D (the fourth from the bottom) has four transition pixels and a blur kernel size 320 of four; (iii) profile E (the second from the top) has six transition pixels and a blur kernel size 320 of six; and (iv) profile F (the top profile has eight transition pixels and a blur kernel size 320 of eight. In this graph, the edge in profile A is completely in focus. Further, the degree of blur of the edge increases for each subsequent profile from the bottom to the top of the graph.

It should be noted that in FIG. 3, the blur is illustrated along a single axis. However, for a typical pixel arrangement, the defocus blur is typically isotropic, disk shaped, with a strong correlation between each pixel and its neighboring pixels.

Figure 4:
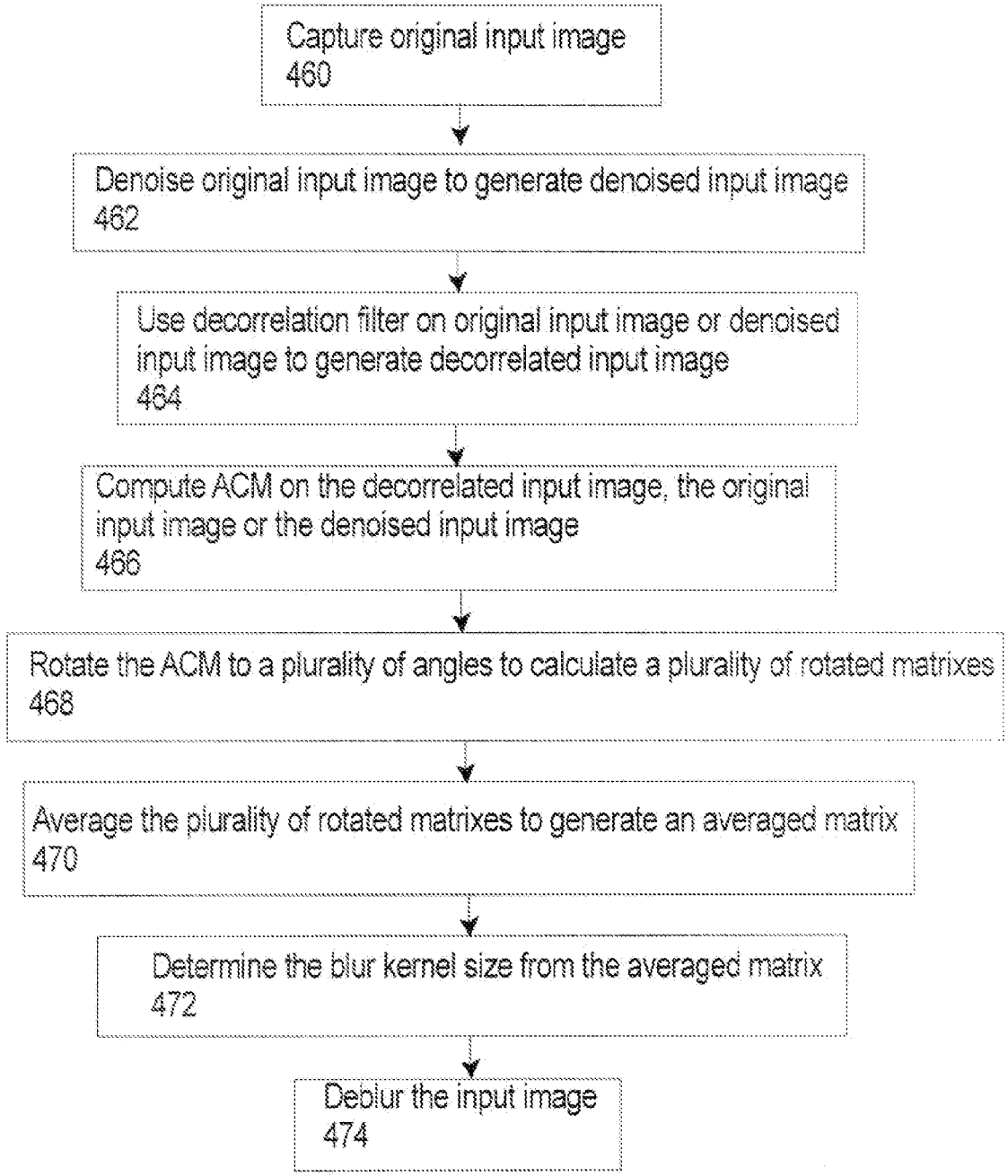
FIG. 4 is a flow chart that illustrates the steps used to estimate the blur kernel size and subsequently deblur the input image.

FIG. 4 is a flow chart that illustrates one or more of the steps used to estimate the blur kernel size 320 (illustrated in FIG. 3) and subsequently deblur the input image 14 (illustrated in FIG. 1). In one embodiment, at step 460, the image apparatus 10 (illustrated in FIG. 1) captures the original input image 14. Next, at step 462, the control system 18 (illustrated in FIG. 1) can denoise the original input image 14 if the original input image 14 is noisy to generate a denoised input image. For example, the original input image 14 can sometimes include artifacts caused by noise. In one embodiment, a smooth region (a region that is substantially uniform in color) of the input image 14 is analyzed to determine if the input image 14 includes noise. If the smooth region has a variation in color, these variations can be attributed to noise. A number of algorithms currently exist for detecting and reducing noise from an input image. One suitable algorithm used for reducing noise is commonly referred to as a wavelet based denosing algorithm as disclosed by Portiall, J. Strela, V. Wainwright, Simoncelli, in "Image denoising using scale maixtures of gaussians in the wavelet domain", IEEE Trans. On Image Processing 2003, the contents of which are incorporated herein by reference.

It should be noted that if the original input image 14 is relatively free of noise, that step 462 can be unnecessary and can be optional.

Subsequently, at step 464, the control system 18 can use a decorrelation filter on the original input image or the denoised input image to reduce content correlation from the original input image or the denoised input image to create a decorrelated input image. Content correlation in an image relates to the correlation between a pixel and its neighbors that results from the pixels capturing similar colors from the same object in the scene. For example, if a portion of an image includes a wall that is uniform in color, all of the pixels of the image that represent that wall will have a strong correlation that results from the wall being uniform in color. Thus, the structures in scene influence the correlation between a pixel and its neighbors. The present invention reduces the amount of content correlation during the procedure to determine the blur size.

As provided herein, the decorrelation filter reduces the amount of content correlation from the original input image or the denoised input image. In certain embodiments, the decorrelation filter removes most or almost all of the content correlation. As provided herein, when the content correlation is completely removed, the remaining correlation within the original input image or the denoised input image can be associated with blur.

In one, non-exclusive embodiment, the decorrelation filter is a Laplace type filter. A Laplacian is an isotropic measure of the $2^{nd}$ derivative of an image. As an example, a 3×3 Lapalacian Filter can be expressed as follows:

$$\begin{bmatrix} -1 & -1 & -1 \\ -1 & 8 & -1 \\ -1 & -1 & -1 \end{bmatrix}$$

As provided herein, when the Lapalacian filter is applied to the image, the regions of rapid intensity changes in the image are highlighted.

The size of the Laplace filter can be varied to achieve the desired level of decorrelation. In non-exclusive examples, the Laplace filter can be a 3×3, 5×5, 7×7, or 9×9 filter. It should be noted that with the Laplace filter, in a region that is uniform in brightness, the result is to reduce the grey level to zero. When discontinuity is present within the neighborhood of the (e.g. a point, line or edge), the result is a non-zero grey level value. Alternatively, the decorrelation filter can be an adaptive filter that adjusts to the content of the original input image or the denoised input image.

Subsequently, at step 466, the control system 18 computes an autocorrelation matrix ("ACM") for the decorrelated input image. The ACM can be generated by comparing the decorrelated input image ("input matrix") with a shifted version of the decorrelated input image ("shifted matrix"). In one embodiment, to generate the ACM, the control system computes the correlation in intensity between the pixels of the decorrelated input image and the pixels of the shifted version of the decorrelated input image. Basically, the ACM represents the correlation input matrix and its shifted matrix.

In alternative embodiments, the ACM can be generated by the control system from the original input or the denoised input image.

Figure 5:
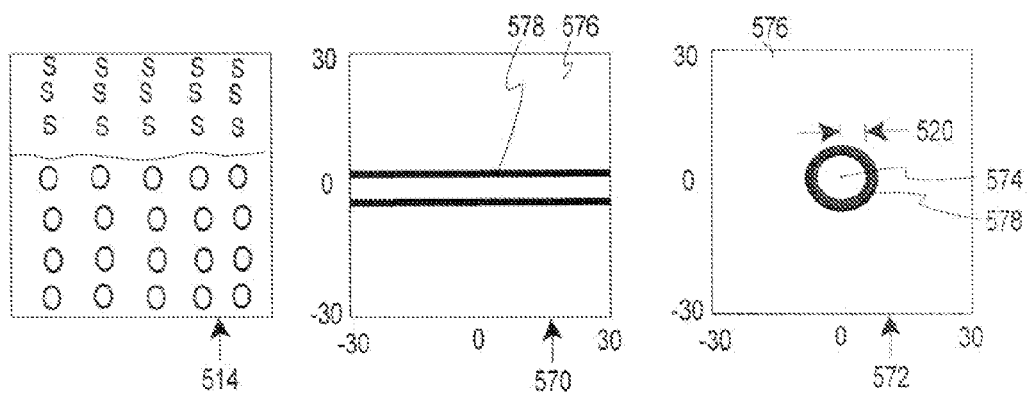
FIG. 5 illustrates a simplified input image, a simplified autocorrelation matrix for the input image, and a simplified average autocorrelation matrix for the input image.

FIG. 5 illustrates one simplified example of an original input image 514, and the resulting ACM 570 from the decorrelated input image. In this embodiment, the ACM 570 has a shifted range of thirty. Stated in another fashion, the pixels have been shifted thirty to the left, thirty to the right, thirty up, and thirty down. Alternatively, the ACM can have a larger or smaller shifted range than thirty.

In this example, the original input image 514 is of the ocean (represented with "O's") and the sky (represented with "S's"). For the matrixes illustrated herein, the white area 576 represents a low/small correlation (a negative value) between the pixels, while the dark area 578 represents a high/strong correlation (a positive value) between the pixels.

A review of the resulting ACM 570 reveals that the features and content ("scene structure") of the original image 514 can bias the ACM 570 to be biased. More specifically, in FIG. 5, the scene structure of the horizontal transition between the ocean and the sky clearly biases the resulting ACM 570 to have a high correlation area 578 that is horizontal biased. Thus, in this example, when the input image has been shifted horizontally, there is a strong correlation between the input image and the shifted image because of the objects in the scene. As a result thereof, the dominant edges of the structures in the scene can bias and influence the resulting ACM 570. Thus, the decorrelation filter is not able to completely eliminate the content correlation from the input image.

It should be noted that if the transitions/edges of the objects in that scene are at an angle relative to the horizon, such as a pitched roof, or another angled structure, the resulting ACM will have a somewhat similar angled bias.

Referring back to FIG. 4, next, at step 468, the control system rotates the ACM 570 around it's center to a plurality of alternative angles to calculate a plurality of rotated ACM matrixes. In alternative, non-exclusive examples, the control system can rotate the ACM 570 in increments of 2, 5, 10, 20, 25, 30, 45, or 60 degrees. In one example, if the control system is programmed to rotate the ACM 570 in five degree increments, the control system will calculate 72 rotated matrixes from the ACM 570. Standard procedures can be use to rotate the matrix. As used herein, rotation means that each pixel is moved around the rotation center for a specified angle amount.

Next, at step 470, the control system averages the plurality of individual rotated matrixes to calculate an averaged matrix 572 (illustrated in FIG. 5). For example, the control system can add together the individual rotated matrixes and subsequently divide by the total number of individual rotated matrixes. The result is the averaged matrix 572. In the example provided above with the five degree increments, the control system will sum the 72 rotated matrixes together and subsequently divide that total by 72.

As provided herein, averaging the plurality of matrixes reduces the bias from scene structure. More specifically, because out of focus blur is generally isotropic shaped, it is indifferent to rotation. In contrast, the scene structure is typically not isotropic, and thus, the scene structure is typically not indifferent to rotation. As a result thereof, the averaged matrix 572 will have further reduced the scene structure bias, while not influencing the out of focus blur. Thus, the resulting averaged matrix 572 has a high correlation area 578 (positive value) that is generally disk shaped and the high correlation area 578 no longer includes significant scene structure bias.

From the averaged matrix 572, the blur size 520 can be determined. More specifically, as provided herein, the disk shaped high correlation area 578 of the averaged matrix 572 corresponds to the amount of defocus blur 16 (illustrated in FIG. 1) in the input image 14 (illustrated in FIG. 1). In one embodiment, the control system 18 (illustrated in FIG. 1) calculates a distance between a middle 574 of the averaged matrix 572 and the inner edge of the disk shaped high correlation area 578. The control system 18 then sets this distance as equal to an estimated blur size 520. Stated in another fashion, in one embodiment, the estimated blur size 50 is equal to a radius of the high correlation area 578 of the averaged matrix 572.

In the embodiment illustrated in FIG. 5, the high correlation area 578 of the averaged matrix 572 has a radius of approximately eight pixels. Thus, in this example, the control system 18 will estimate the blur size 50 to be eight pixels.

As provided herein, the averaged matrix 572 reveals the true autocorrelation of the blur size 50 while removing the scene-structure bias. Moreover, the averaged ACM eliminates the residual content correlation and reduces the influence of features in the image.

In certain embodiments, depending upon the image, the resulting averaged matrix can have multiple, spaced apart annular shaped high correlation areas.

For example, an image with a truly small defocus blur size can have a relatively small diameter, high correlation area, and a relatively large diameter high correlation area. Further, in certain embodiments, input images containing heavy noise or images lacking textures can lead to multiple high correlation areas that can lead to an incorrect defocus blur kernel estimation. In these embodiments, the control system 18 will need to select the proper high correlation area to estimate the blur size.

Figure 6A:
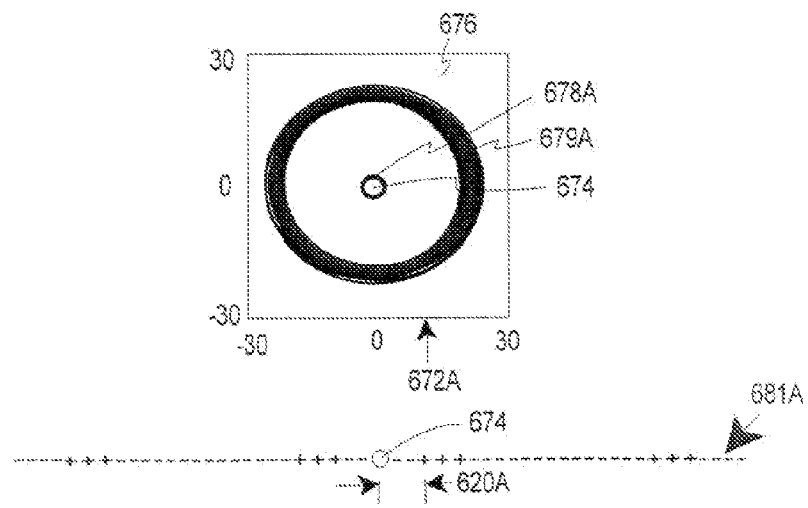
FIGS. 6A, 6B, and 6C illustrate three simplified alternative averaged matrixes that results from three alternative input images.

FIG. 6A illustrates an averaged matrix 672A for an image (not shown) having a small defocus blur size. In this example, the averaged matrix 672A has a first high correlation area 678A that is centered around the middle 674 and a second high correlation area 679A that is also centered around the middle 674. In this example, the first high correlation area 678A has an inner radius of approximately two pixels and the second high correlation area 679A has an inner radius of approximately twenty pixels.

FIG. 6A also illustrates a one dimensional pixel array 681A for a portion of the pixels of the averaged matrix 672A with negative signs ("−") that represent low correlation areas 676, positive signs ("+") that represent high correlation areas 678A, 679A, and a circle that represents the middle 674.

Figure 6B:
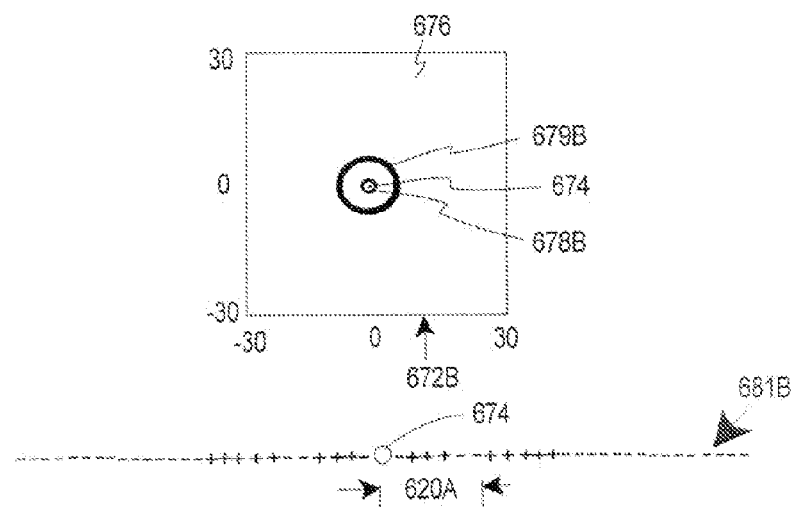

FIG. 6B illustrates an averaged matrix 672B for another image (not shown) having a relatively moderate defocus blur size. In this example, the averaged matrix 672B again has a first high correlation area 678B that is centered around the middle 674 and a second high correlation area 679B that is also centered around the middle 674. In this example, the first high correlation area 678B has an inner radius of approximately one pixel and the second high correlation area 679B has an inner radius of approximately seven pixels.

FIG. 6B also illustrates a one dimensional pixel array 681B for a portion of the pixels of the averaged matrix 672B with negative signs ("−") that represent low correlation areas 676, positive signs ("+") that represent high correlation areas 678B, 679B, and a circle that represents the middle 674.

Figure 6C:
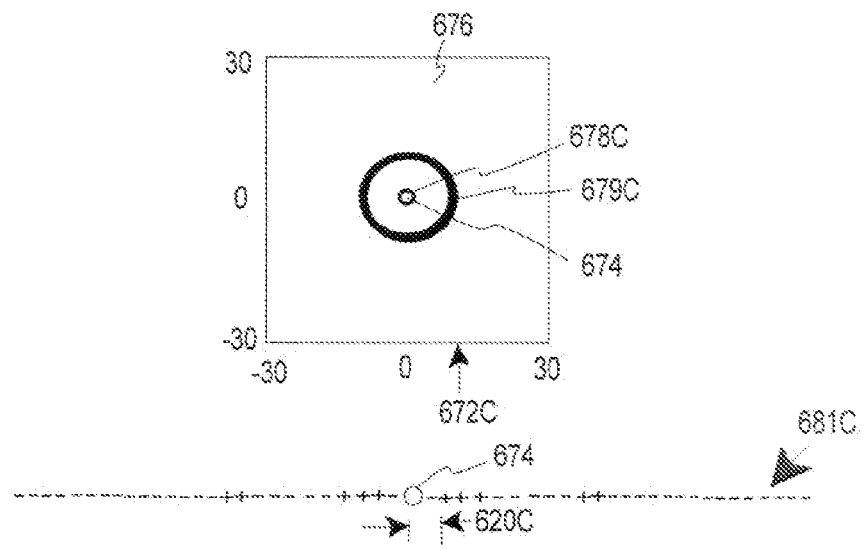

FIG. 6C illustrates an averaged matrix 672C for yet another image (not shown) having a relatively large defocus blur size. In this example, the averaged matrix 672C again has a first high correlation area 678C that is centered around the middle 674 and a second high correlation area 679C that is also centered around the middle 674. In this example, the first high correlation area 678C has an inner radius of approximately one pixel and the second high correlation area 679C has an inner radius of approximately ten pixels.

FIG. 6C also illustrates a one dimensional pixel array 681C for a portion of the pixels of the averaged matrix 672C with negative signs ("−") that represent low correlation areas 676, positive signs ("+") that represent high correlation areas 678C, 679C, and a circle that represents the middle 674.

In the embodiments illustrated in FIGS. 6A-6C, the control system 18 will need to select the proper high correlation area to estimate the blur size.

In one embodiment, if the first detected low correlation area of the averaged matrix is less than a predetermined low threshold, the control system checks if the averaged matrix is the result of a small kernel size or a noise biased averaged matrix. For example, the predetermined low threshold can be five. In the examples illustrated in FIGS. 6A-6C, each of the averaged matrixes 672A-672C has a first detected low correlation area that is less than five. Thus in these examples, the control system needs to perform additional analysis to determine if the averaged matrix is the result of a small kernel size or a noise biased averaged matrix.

In one embodiment, the control system evaluates the second high correlation area 679A-679C to determine if the averaged matrix is the result of a small kernel size or a noise biased averaged matrix. In one non-exclusive example, if the second high correlation area 679A-679C has a radius that is less than a predetermined radius threshold, the control system selects the radius of the second high correlation area 679A-679C as the blur size. Alternatively, if the second high correlation area 679A-679C has a radius that is greater than the predetermined radius threshold, the control system selects the radius of the first high correlation area 678A-678C as the blur size.

In one non-exclusive example, the predetermined radius threshold can be eight. Using this example, in FIG. 6A, the second high correlation area 679A has a radius that is greater than the predetermined radius threshold (twenty is greater than eight). Thus, the control system selects the radius of the first high correlation area 678A as the blur size. Thus, in this example, in FIG. 6A, the blur size is two.

Also, using the predetermined radius threshold of eight, in FIG. 6B, the second high correlation area 679B has a radius that is less than the predetermined radius threshold (seven is less than eight). Thus, the control system selects the radius of the second high correlation area 679B as the blur size. Thus, in this example, in FIG. 6B, the blur size is seven.

Further, using the predetermined radius threshold of eight, in FIG. 6C, the second high correlation area 679C has a radius that is greater than the predetermined radius threshold (ten is greater than eight). Thus, the control system selects the radius of the first high correlation area 678C as the blur size. Thus, in this example, in FIG. 6C, the blur size is one.

Again referring back to FIG. 4, finally, at step 474, the control system can deblur the input image 14 utilizing the estimated blur size to generate the blur kernel and provide the deblurred adjusted image 22. It should be noted that defocus blur can be corrected relatively easily once the blur size is estimated. One suitable algorithm used for deblurring the input image 10 is commonly referred to as Lucy-Richarson iterative restoration algorithm.

In certain embodiments, when there is significant defocus blur, the control system 18 (illustrated in FIG. 1) can first downsample the input image to simplify the computations. Stated in another fashion, in certain embodiments, using the present method, it is easier to estimate smaller defocus blur than larger defocus blur. Thus, the control system 18 downsamples the input image to reduce the amount of defocus blur.

Figure 7A:
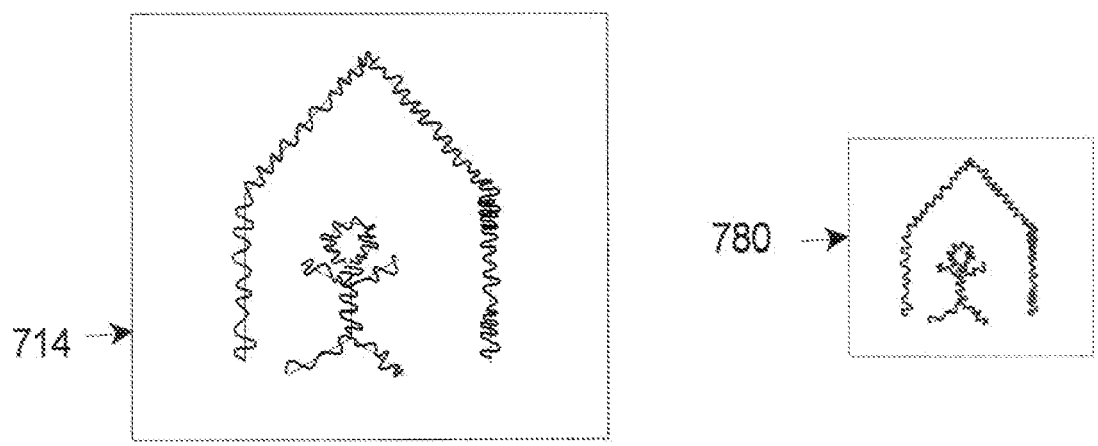
FIG. 7A illustrates an input image, and a simplified, downsampled input image.

FIG. 7A illustrates the original input image 14 and a downsampled version of the input image 780. In alternative, non-exclusive embodiments, the downsampled image 780 is approximately 10, 20, 25, 30, 45, or 50 percent of the size of the original input image 780. Downsampling of the original input image 14 can be done by bicubic downsampling. In this example, the downsampled image 780 is approximately 50 percent of size of the original input image.

Figure 7B:
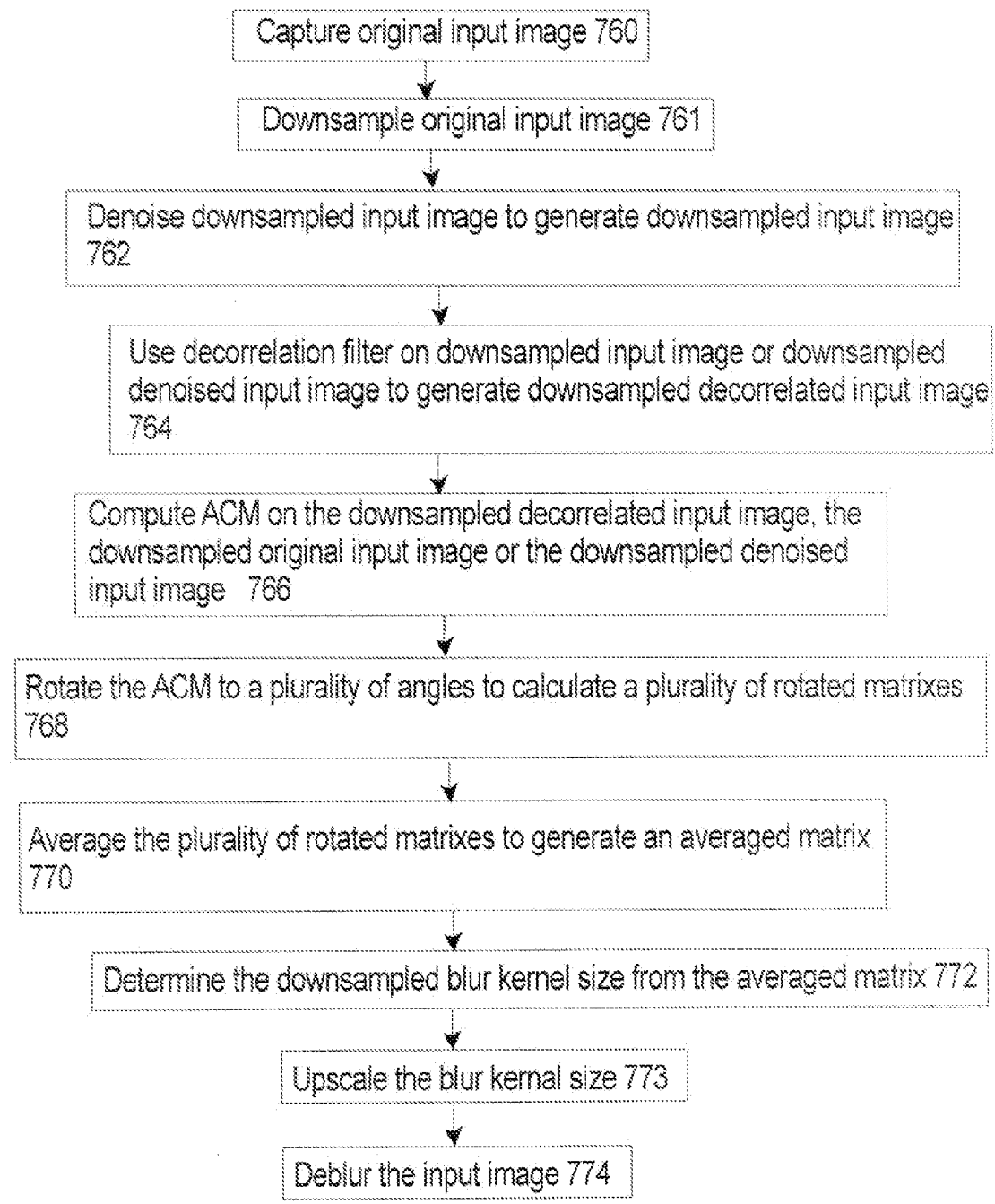
FIG. 7B is a flow chart that illustrates another embodiment of the steps used to estimate the blur kernel size and subsequently deblur the input image.

FIG. 7B is a flow chart that illustrates one or more of the steps used to estimate the blur kernel size 320 (illustrated in FIG. 3) for a heavily defocus blurred image, and subsequently deblur the input image 14 (illustrated in FIG. 1). Many of the steps illustrated in FIG. 7B are similar to the steps described above and illustrated in FIG. 4.

In one embodiment, at step 760, the image apparatus 10 (illustrated in FIG. 1) captures the original input image 14.

Subsequently, at step 761, the control system 18 can downsample the original input image. Next, at step 762, the control system 18 (illustrated in FIG. 1) can denoise the downsampled input image 14 if the original input image 14 is noisy to generate a denoised input image. Subsequently, at step 764, the control system 18 can use a decorrelation filter on the downsampled input image or the denoised downsampled input image to reduce content correlation and to create a downsampled decorrelated input image.

Next, at step 766, the control system 18 computes an autocorrelation matrix ("ACM") for the downsampled decorrelated input image.

Next, at step 768, the control system rotates the ACM around it's center to a plurality of alternative angles to calculate a plurality of rotated ACM matrixes.

Next, at step 770, the control system averages the plurality of individual rotated matrixes to calculate an averaged matrix.

Subsequently, at step 772, the control system determines the downsampled blur kernel size from the averaged matrix.

At step 773, the control system upscales the estimated blur size (e.g. multiples the downsampled blur kernel size by the downsample rate). In this example, because the downsampled image is approximately 50 percent of the input image, the initial blur size is multiplied by two.

Finally, at step 774, the control system deblurs the input image utilizing the estimated blur size.

Figure 8:
FIG. 8 illustrates another embodiment of an estimating system having features of the present invention.

FIG. 8 illustrates another embodiment of an estimating and deblurring system 890 having features of the present invention. In this embodiment, the image apparatus 10 again captures the input image 14 (illustrated in FIG. 1). However, in this embodiment, the input image 14 is transferred to a computer 892 (e.g. a personal computer) that includes a computer control system 818 (illustrated in phantom) that uses the estimation method disclosed herein to estimate the blur kernel size. Further, the computer control system 818 can deblur the blurred image 14 and provide the adjusted image 22.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating defocus blur size in a blurred input image, the method comprising the steps of:
   removing at least a portion of any content correlation from the input image to generate a decorrelated image;
   computing an autocorrelation matrix from the decorrelated image;
   rotating the autocorrelation matrix to a plurality of alternative angles to generate a plurality of rotated matrixes;
   averaging the plurality of rotated matrixes to calculate an averaged matrix; and
   estimating a defocus blur size from the averaged matrix.

2. The method of claim 1 wherein the step of removing includes the step of applying a decorrelation filter to the input image.

3. The method of claim 1 wherein the step of removing includes the step of applying a laplace filter to the input image.

4. The method of claim 1 further comprising the step of deblurring the input image using the defocus blur size to provide an adjusted image.

5. The method of claim 1 further comprising the step of removing noise from the input image.

6. The method of claim 1 further comprising the step of downsampling the input image.

7. A device for estimating a defocus blur size in a blurred input image, the device comprising:
   a control system that (i) removes at least a portion of any content correlation from the input image to generate a decorrelated image; (ii) computes an autocorrelation matrix from the decorrelated image; (iii) rotates the autocorrelation matrix to a plurality of alternative angles to generate a plurality of rotated matrixes; (iv) averages the plurality of rotated matrixes to calculate an averaged matrix; and (v) estimates a defocus blur size from the averaged matrix.

8. The device of claim 7 wherein the control system applies a decorrelation filter to the input image to remove the content correlation.

9. The device of claim 7 wherein the control system deblurs the input image using the defocus blur size to provide an adjusted image.

10. The device of claim 7 wherein the control system removes noise from the input image.

11. The device of claim 7 wherein the control system downsamples the input image.

12. A method for estimating defocus blur size in a blurred input image, the method comprising the steps of:
   computing an autocorrelation matrix from the input image;
   rotating the autocorrelation matrix to a plurality of alternative angles to generate a plurality of rotated matrixes;
   averaging the plurality of rotated matrixes to calculate an averaged matrix; and
   estimating a defocus blur size from the averaged matrix.

13. The method of claim 12 further comprising the step of deblurring the input image using the defocus blur size to provide an adjusted image.

14. The method of claim 12 further comprising the step of removing noise from the input image.

15. The method of claim 12 further comprising the step of downsampling the input image.

16. A device for estimating a defocus blur size in a blurred input image, the device comprising:
   a control system that (i) computes an autocorrelation matrix from the input image; (ii) rotates the autocorrelation matrix to a plurality of alternative angles to generate a plurality of rotated matrixes; (iii) averages the plurality of rotated matrixes to calculate an average autocorrelation matrix; and (iv) estimates a defocus blur size from the average autocorrelation matrix.

17. The device of claim 16 wherein the control system deblurs the input image using the defocus blur size to provide an adjusted image.

18. The device of claim 16 wherein the control system removes noise from the input image.

19. The device of claim 16 wherein the control system downsamples the input image.

* * * * *